United States Patent
Nalam et al.

(10) Patent No.: US 9,485,132 B2
(45) Date of Patent: Nov. 1, 2016

(54) AUTOMATED SAN NETWORK TOPOLOGICAL DIAGRAM AND POINT-TO-POINT CABLING CREATION FOR CUSTOMERS ENVIRONMENTS

(71) Applicant: Dell Products, LP, Round Rock, TX (US)

(72) Inventors: Lakshmi S. Nalam, Bangalore (IN); Matthew C. Harris, Derry, NH (US)

(73) Assignee: Dell Products, LP, Round Rock, TX (US)

( * ) Notice: Subject to any disclaimer, the term of this patent is extended or adjusted under 35 U.S.C. 154(b) by 162 days.

(21) Appl. No.: 14/272,854

(22) Filed: May 8, 2014

(65) Prior Publication Data

US 2015/0326424 A1    Nov. 12, 2015

(51) Int. Cl.
*H04L 29/08* (2006.01)
*H04L 12/24* (2006.01)
*G06F 17/22* (2006.01)
*G06F 17/21* (2006.01)

(52) U.S. Cl.
CPC .............. *H04L 29/08* (2013.01); *G06F 17/211* (2013.01); *G06F 17/2247* (2013.01); *H04L 41/0266* (2013.01); *H04L 41/04* (2013.01); *H04L 41/12* (2013.01); *H04L 67/02* (2013.01)

(58) Field of Classification Search
CPC ....... H04L 41/04; H04L 67/02; H04L 29/08; H04L 41/0266; H04L 41/12; G06F 17/2247; G06F 17/221
See application file for complete search history.

(56) References Cited

U.S. PATENT DOCUMENTS 7,437,434 B2 * 10/2008 Zintel ................. H04L 12/2803 709/220
8,019,849 B1 * 9/2011 Lopilato ............... G06F 17/302 709/203
2005/0198591 A1 * 9/2005 Jarrett .................... G06K 9/222 715/863
2005/0283410 A1 * 12/2005 Gosko ................... G06Q 30/06 705/26.44
2009/0249213 A1 * 10/2009 Murase ................. G06F 9/4443 715/735
2011/0167154 A1 * 7/2011 Bush ................... H04L 12/2807 709/224
2012/0182987 A1 * 7/2012 Gallant ................... H04L 12/14 370/352

FOREIGN PATENT DOCUMENTS

CN      101051965 A  * 10/2007 ............ H04L 12/26

OTHER PUBLICATIONS

Smithers, "Review: Firewall operations management software", Jul. 12, 2010, IT World Canada, 5 pages.*

* cited by examiner

*Primary Examiner* — Brian J Gillis
*Assistant Examiner* — Amy Ling
(74) *Attorney, Agent, or Firm* — Hamilton, Brook, Smith & Reynolds, P.C.

(57) ABSTRACT

A method of presenting a network architecture includes identifying two or more network devices for interconnection analysis, collecting information describing communications paths between two or more network devices, and converting the collected information into a markup language format. The method further includes generating, from the markup language format, a listing of the network devices and a listing of connections between the network devices. The method also includes instantiating, based on the listing of the network devices, one or more images depicting each of the two or more network devices. The method further includes instantiating, based on the listing of connections, one or more images depicting connections between the two or more network devices.

20 Claims, 10 Drawing Sheets

FIG. 1

| Device Make | Device Model | Device Name | iSCSI Interfaces | iSCSI Mac-Address | Switch Name / IP-Address | Port | Media Type |
|---|---|---|---|---|---|---|---|
| PS-M4110 | 70-0450 | C2-M4110-m2-CM0 | Eth0 | 90:b1:1c:08:07:f0 | C2-MXL-B1 / 10.126.124.169 | Te 0/14 | bck-plane |
| | | C2-M4110-m2-CM0 | Eth1 | 90:b1:1c:08:07:f1 | | Te 0/14 | bck-plane |
| | | C2-M4110-m2-CM1 | Eth0 | 90:b1:1c:08:07:f0 | C2-MXL-B1 / 10.126.124.170 | Te 0/14 | bck-plane |
| | | C2-M4110-m2-CM1 | Eth1 | 90:b1:1c:08:07:f1 | | Te 0/14 | bck-plane |
| Dell PowerEdge | M420 | ESX5.5 | vmnic2/vmk1 | 00:50:56:6a:1c:05 | 10.126.124.170 | Te 0/14 | bck-plane |
| | | | vmnic3/vmk2 | 00:50:56:62:ef:71 | 10.126.124.169 | Te 0/12 | bck-plane |
| Dell Force10 | MXL | 10.126.124.169 | B1- | d0:57:a5:a7:b2:4a | 10.126.124.172 | Te0/33, Te0/34 Te0/35, Te0/36 | 40GBASE-SR4 |
| Dell Force10 | MXL | 10.126.124.170 | B2- | d0:57:a5:a7:b2:0e | 10.126.124.173 | Te0/33, Te0/34 Te0/35, Te0/36 | 40GBASE-SR4 |

----------------------ACL Information---------------------
Volume Name: vss-control
ACL: read-write
No CHAP User/s
No Initiator Name/s
No IPAddress/es
Storage Pool: default
----------------------ACL Information---------------------
Volume Name: VMVol2
ACL: read-write
No CHAP User/s
Initiator Name/s: iqn.1998-01.com.vmware:ESXi55-S1-00cb38a2, iqn.1998-01.com.vmware:ESXi55-S4-49fc30e1, iqn.1998-01.com.vmware:esxi55-S3-191fc877, iqn.1998-01.com.vmware:ESXi55-S2-1d938d8f
IPAddress/es: 0.0.0.0, 0.0.0.0, 0.0.0.0, 0.0.0.0
Storage Pool: default
----------------------ACL Information---------------------
Volume Name: Media
ACL: read-write
No CHAP User/s
Initiator Name/s: iqn.1998-01.com.vmware:ESXi55-S1-00cb38a2, iqn.1998-01.com.vmware:ESXi55-S2-1d938d8f, iqn.1998-01.com.vmware:esxi55-S3-191fc877, iqn.1998-01.com.vmware:ESXi55-S4-49fc30e1
IPAddress/es: 0.0.0.0, 0.0.0.0, 0.0.0.0, 0.0.0.0
Storage Pool: default
----------------------ACL Information---------------------
Volume Name: VMVol1
ACL: read-write
No CHAP User/s
Initiator Name/s: iqn.1998-01.com.vmware:ESXi55-S1-00cb38a2, iqn.1998-01.com.vmware:ESXi55-S2-1d938d8f, iqn.1998-01.com.vmware:esxi55-S3-191fc877, iqn.1998-01.com.vmware:ESXi55-S4-49fc30e1
IPAddress/es: 0.0.0.0, 0. 0.0.0, 0.0.0.0, 0.0.0.0
Storage Pool: default

FIG. 6A

```
----------------------Connections Information---------------------
Volume Name: vss-control
Storage Pool: default
----------------------Connections Information---------------------
Volume Name: VMVol2
IP Address Connected from: 192.168.10.201
Initiator Name Connected from:  iqn1998-01.com.vmware:ESXi55-S4-49fc30e1
IP Address Connected from: 192.168.10.201
Initiator Name Connected from:  iqn1998-01.com.vmware:ESXi55-S4-49fc30e1
IP Address Connected from: 192.168.10.201
Initiator Name Connected from:  iqn.1998-01.com.vmware:esxi55-S3-191fc877
IP Address Connected from: 192.168.10.201
Initiator Name Connected from:  iqn.1998-01.com.vmware:esxi55-S3-191fc877
IP Address Connected from: 192.168.10.201
Initiator Name Connected from:  iqn1998-01.com.vmware:ESXi55-S2-1d938d8f
IP Address Connected from: 192.168.10.201
Initiator Name Connected from:  iqn1998-01.com.vmware:ESXi55-S2-1d938d8f
IP Address Connected from: 192.168.10.201
Initiator Name Connected from:  iqn1998-01.com.vmware:ESXi55-S1-00cb38a2
IP Address Connected from: 192.168.10.201
Initiator Name Connected from:  iqn1998-01.com.vmware:ESXi55-S1-00cb38a2
IP Address Connected from: 192.168.10.202
Initiator Name Connected from:  iqn1998-01.com.vmware:ESXi55-S4-49fc30e1
IP Address Connected from: 192.168.10.202
Initiator Name Connected from:  iqn1998-01.com.vmware:ESXi55-S4-49fc30e1
IP Address Connected from: 192.168.10.202
Initiator Name Connected from:  iqn.1998-01.com.vmware:esxi55-S3-191fc877
IP Address Connected from: 192.168.10.202
Initiator Name Connected from:  iqn.1998-01.com.vmware:esxi55-S3-191fc877
IP Address Connected from: 192.168.10.202
Initiator Name Connected from:  iqn1998-01.com.vmware:ESXi55-S2-1d938d8f
IP Address Connected from: 192.168.10.202
Initiator Name Connected from:  iqn1998-01.com.vmware:ESXi55-S2-1d938d8f
IP Address Connected from: 192.168.10.202
Initiator Name Connected from:  iqn1998-01.com.vmware:ESXi55-S1-00cb38a2
IP Address Connected from: 192.168.10.202
Initiator Name Connected from:  iqn1998-01.com.vmware:ESXi55-S1-00cb38a2
Storage Pool: default
----------------------Connections Information---------------------
Volume Name: Media
IP Address Connected from: 192.168.10.201
Initiator Name Connected from:  iqn1998-01.com.vmware:ESXi55-S4-49fc30e1
IP Address Connected from: 192.168.10.201
Initiator Name Connected from:  iqn1998-01.com.vmware:ESXi55-S4-49fc30e1
IP Address Connected from: 192.168.10.201
Initiator Name Connected from:  iqn.1998-01.com.vmware:esxi55-S3-191fc877
```

```
public void GenerateStorageAreaNetwork (String XMLFilename )
{
    try{
      InputStream is = new BufferedInputStream(
      new FileInputStream(XMLFilename));

//DOM Parser
      XStream xs = new XStream(new DomDriver ("UTF-8"));

san = new SAN();
      xs.fromXML(is, san);
    }
    catch( FileNotFoundException fnfe )
    {
    System.out.println("Exception thrown - " + fnfe);
    }
}
```

FIG. 8A

```
Connection conn = new Connection();
conn.endPoint1 = endPoint1;
conn.endPoint2 = endPoint2;

connectionList.add(conn);
```

FIG. 8B

```
public void RenderSANTopology( Graphics2D g2d )
{
    Dimension d = null;
    Point pos = null;
    Device dev = null;
    for( int a = 0; a< san.serverList.size(); a++)
    {
        Server srv = (Server)san.serverList.get(a);
        pos = CalculatePosition(srv, a);
        d = RenderServer( g2d, srv , pos );
        dev = srv;
        Rectangle r = new Rectangle( pos.x, pos.y,  d.width, d.height);
        images.put( r , dev);

```
public void RenderConnection( Graphics2D g2d, Connection conn )
{
    String keyString1 = new String( conn.endPoint1.deviceId+ ":"+ conn.endPoint1.adapterId+":"+ conn.endPoint1.portNo);
    String keyString2 = new String( conn.endPoint2.deviceId+ ":"+ conn.endPoint2.adapterId+":"+ conn.endPoint2.portNo);

Point p1=(Point)portMap.get(keyString1);
    Point p2=(Point)portMap.get(keyString2);

QuadCurve2D.Double qc = new QuadCurve2D.Double(p1.x,p1.y,p1.x-50,p1.y-50,
                                    p2.x,p2.y);
    g2d.setPaint(Color.RED)1
    g2d.draw(qc);
    g2d.fillOval(p1.x-2, p1.y-2, 4, 4);
    g2d.fillOval(p2.x-2, p2.y-2, 4, 4);
}
```

FIG. 8D

AUTOMATED SAN NETWORK TOPOLOGICAL DIAGRAM AND POINT-TO-POINT CABLING CREATION FOR CUSTOMERS ENVIRONMENTS

BACKGROUND OF THE INVENTION

A Storage Area Network (SAN) is a dedicated network that provides access to consolidated groups of block-level storage devices. A SAN enables multiple servers to share the storage devices, so that SAN users do not need to acquire additional servers to increase storage capacity.

A SAN environment can have architectures can that are extensive and complex, with a large number of components and connections between those components. Troubleshooting SAN environments can be very difficult and time consuming without documentation describing how the system is interconnected.

Existing data gathering and analysis tools do not produce clear and precise configuration documentation that SAN support teams need to efficiently perform their tasks. Without precise information about the target SAN environment, the amount of time and effort it takes to analyze the environment and identify solutions can be significant. Further, without accurate documentation, the support team may have no alternative but to purchase components to solve problems that would be unnecessary if the team had adequate visibility into the system.

SUMMARY OF THE INVENTION

The described embodiments may enable SAN support teams to quickly and accurately characterize components and connections with an SAN environment.

In one aspect, the described embodiments include a method of presenting a network architecture, including identifying two or more network devices for interconnection analysis, collecting information describing communications paths between two or more network devices, and converting the collected information into a markup language format. The method further includes generating, from the markup language format, a listing of the network devices and a listing of connections therebetween. The method also includes instantiating, based on the listing of the network devices, one or more images depicting each of the two or more network devices. The method further includes instantiating, based on the listing of connections therebetween, one or more images depicting connections between the two or more network devices.

One embodiment further includes storing the collected information in a storage medium. In another embodiment, the storage medium is associated with a database. In another embodiment, the collecting information generates one or more log files. In yet another embodiment, the markup language is extensible markup language (XML).

One embodiment further includes providing a graphical user interface upon which to instantiate the images depicting each of the two or more network devices and the images depicting connections between the two or more network devices. In one embodiment, identifying two or more network devices further includes identifying one or more categories of network devices. In another embodiment, the one or more categories of network devices includes one or more of storage devices, host devices, switch devices and router devices.

In one embodiment, instantiating images depicting each of the two or more network devices further includes selecting the images from an image database. In another embodiment, instantiating images depicting connections between the two or more network devices further includes rendering a trace from one of the two or more network devices to another of the two or more network devices, wherein the trace is characterized at least by a width. In another embodiment, the two or more network devices include components of a storage array network.

In another aspect, the described embodiments are a tangible, non-transitory, computer readable medium for storing computer executable instructions for presenting a network architecture, with the computer executable instructions for identifying two or more network devices for interconnection analysis, collecting information describing communications paths between two or more network devices and converting the collected information into a markup language format. The medium further includes instructions for generating, from the markup language format, a listing of the network devices and a listing of connections therebetween. The medium also includes instructions for instantiating, based on the listing of the network devices, one or more images depicting each of the two or more network devices. The medium further includes instructions for instantiating, based on the listing of connections therebetween, one or more images depicting connections between the two or more network devices.

One embodiment further includes instructions for storing the collected information in a storage medium. Another embodiment further includes instructions for storing the collected information in a database system. Another embodiment includes instructions for converting the collected information into an XML format.

One embodiment includes instructions for providing a graphical user interface upon which to instantiate the images depicting each of the two or more network devices and the images depicting connections between the two or more network devices. Another embodiment includes instructions for identifying one or more categories of network devices. Yet another embodiment includes instructions for selecting the images from an image database.

One embodiment includes instructions for rendering a trace from one of the two or more network devices to another of the two or more network devices. The trace is characterized at least by a width. Another embodiment includes instructions for identifying two or more storage area network components.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6B illustrates an exemplary excerpt from a connection log file.

DETAILED DESCRIPTION OF THE INVENTION

A description of example embodiments of the invention follows.

The described embodiments provide a user with a graphical depiction of a network topology. While exemplary embodiments describe analysis of a Storage Area Network (SAN), the underlying concepts may also apply to other types of network architectures. Further, the exemplary embodiments describe the use of the Lasso tool (a product of Dell Inc.) to gather information about network elements and connections between those elements, other techniques for gathering such information may also be used.

Figure 1:
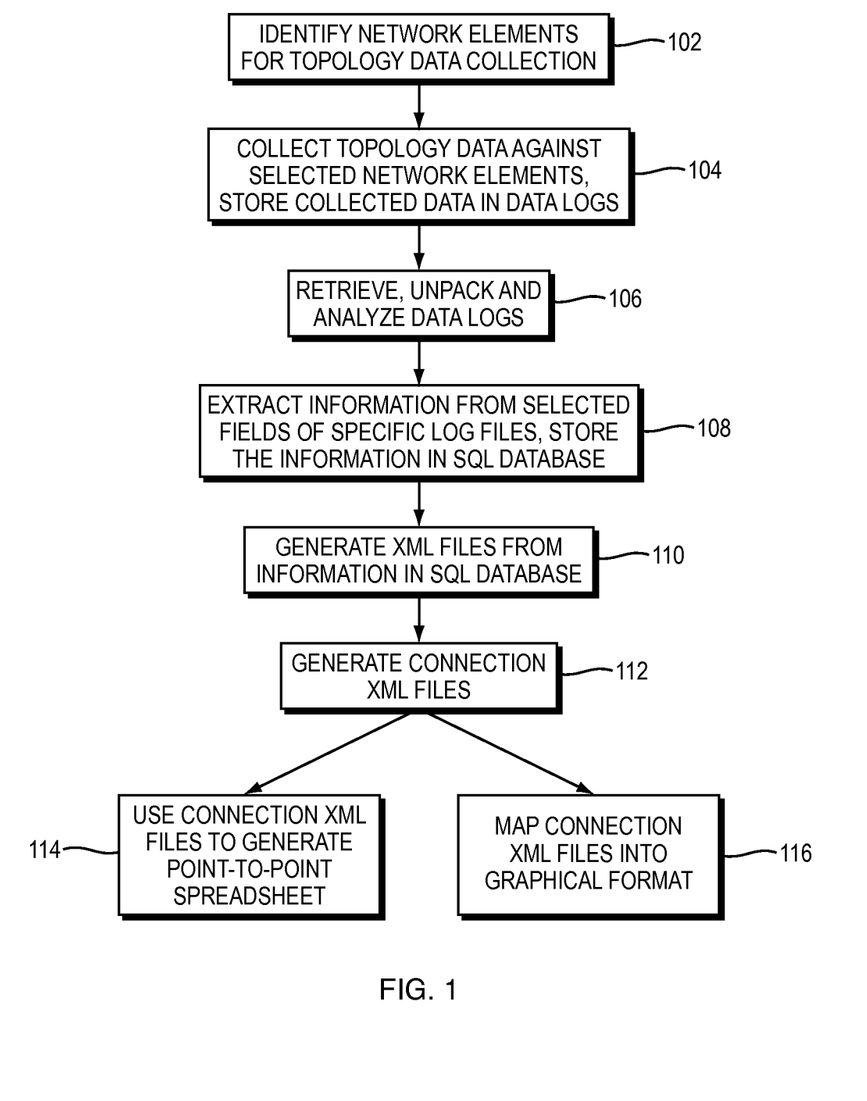
FIG. 1 illustrates an exemplary procedure that may be associated with the described embodiments.

FIG. 1 illustrates an exemplary procedure that may be associated with the described embodiments. A user may initially identify 102 certain network elements to include in the depicted topology. In one exemplary embodiment, the user identifies 102 the network elements by selecting "check boxes" associated with the network elements in a Graphical User Interface (GUI). In other embodiments, the user may identify 102 network elements through other selection techniques know in the art, for example by entering device names at a command prompt or using a mouse or other data entry device to select network element icons in the GUI.

Topology data is collected 104 against the selected network elements. By collecting against only the selected network elements, the user has the option of evaluating the overall network or only a portion of the overall network. The collected data is stored in one or more data logs. In an exemplary embodiment, each network element against which data is collected may have its own dedicated data log, although in other embodiments certain network elements may share data logs.

The data logs are retrieved and unpacked 106, and information is extracted 108 from certain selected fields within the data logs. The certain selected fields may generally include identification information (e.g., network element device make, model, name), port information (e.g., Internet Small Computer System Interface (iSCSI) ports, iSCSI Media Access Control (MAC) addresses) and interconnection information (e.g., identification of connected port, identification of connection destination, type of connection media), although in some embodiments the certain selected fields may include other information. Further, the certain selected fields may include fields that were pre-determined prior to beginning data collection, and/or information specifically selected by the user when the data is collected. The information extracted from the data logs is stored in an SQL database.

The information stored in the SQL database is used to generate XML files 110 that organize the information. The XML files are further processed to generate connection XML files 112, which contain information concerning interconnection between network elements.

The connection XML files are used to generate 114 a table of "point-to-point" connections within the network. In an exemplary embodiment, the point-to-point table is a spread sheet, each row of which describes a connection between two network elements.

Figure 2:
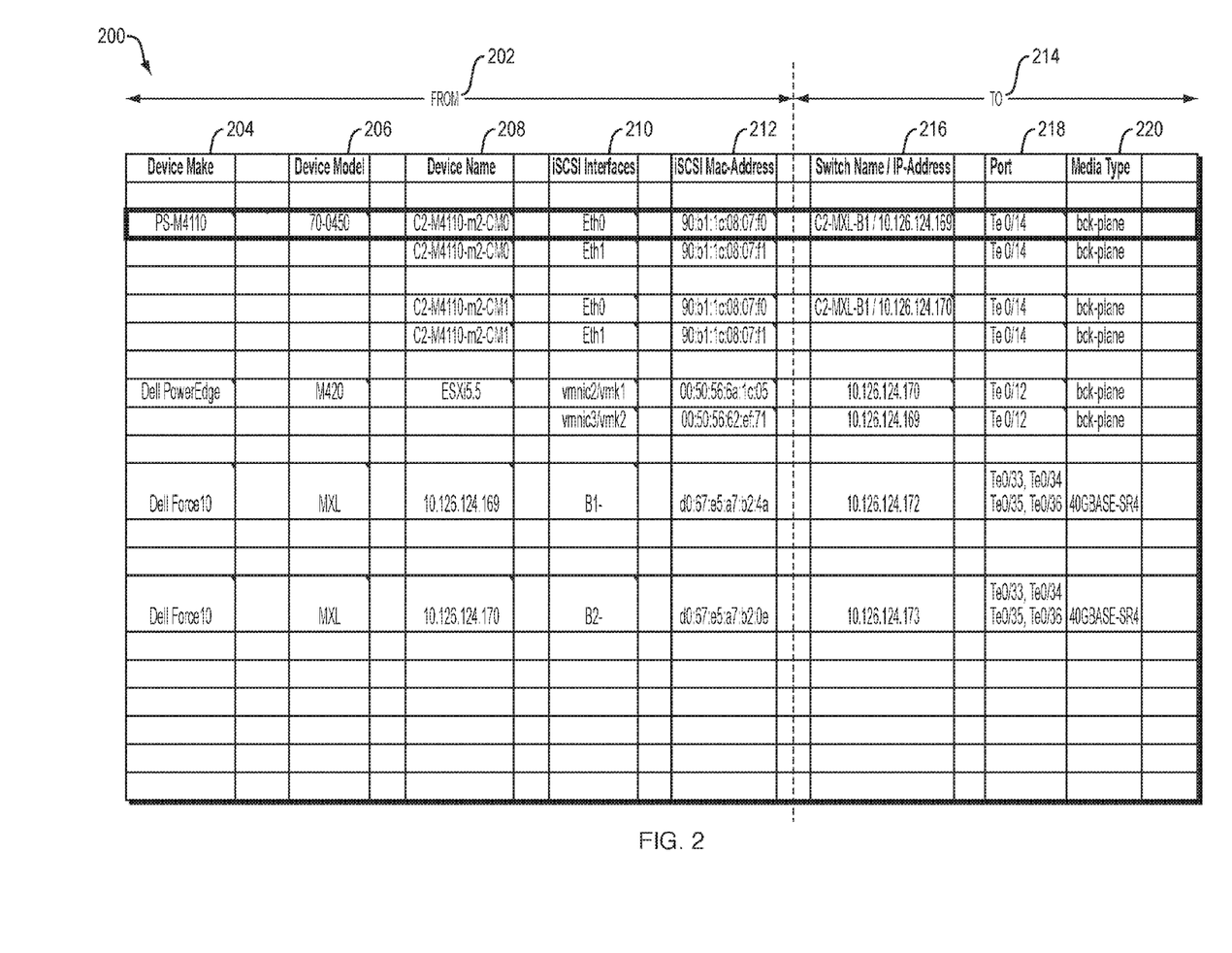
FIG. 2 illustrates an example of a point-to-point spreadsheet according to the described embodiments.

FIG. 2 illustrates an example of a point-to-point spreadsheet 200 according to the described embodiments. The "FROM" portion 202 of the spreadsheet 200 describes a first end of one or more connections. In some embodiments, the first end may be a signal source, although the first end may describe a connection terminal regardless of its role as a signal source or sink.

The FROM portion 202 of the spreadsheet 200 includes a column identifying the network element device make 204, a column identifying the network element device model 206 and a column identifying the network element device name 208. The FROM portion 202 of the spreadsheet 200 further includes a column identifying a port 210 of the network element (in this example, the port is an iSCSI port) and a MAC address 212 of the port.

The "TO" portion 214 of the spreadsheet 200 describes a second end of the one or more connections. In some embodiments, the second end may be a signal sink, although the second end may describe a connection terminal regardless of its role as a signal source or sink. The TO portion 214 of the spreadsheet 200 includes a column describing Switch Name and/or Switch Management IP-Address 216, a column describing a port name 218 and a column describing the media type 220 of the connection.

One connection described by spreadsheet 200 (shown with a bold outline) goes from network element C2-M4220-M2-CM0, which is a model 70-0450of device make PS-M4110. The connection goes to switch C2-MXL-B1 at IP Address 10.126.124.169. The connection couples iSCSI port Eth0 (MAC address 90:b1:1c:08:07:f0)of C2-M4220-M2-CM0 to port Te 0/14 of switch C2-MXL-B 1. The media type 220 is listed as "bck-plane," which means that the connection is a backplane connection.

The information within the connection XML files may also be mapped 116 into a graphical format. In an exemplary embodiment, the graphical format is a block diagram, with network elements depicted as device icons, and connections depicted as lines, bars or icons that represent specific media types. For example, the network element device make, model and name information in the point-to-point connection table is mapped to device icons. Similarly, the port and interconnection information is mapped to lines, bars or media icons that are shown connecting the device icons.

Figure 3:
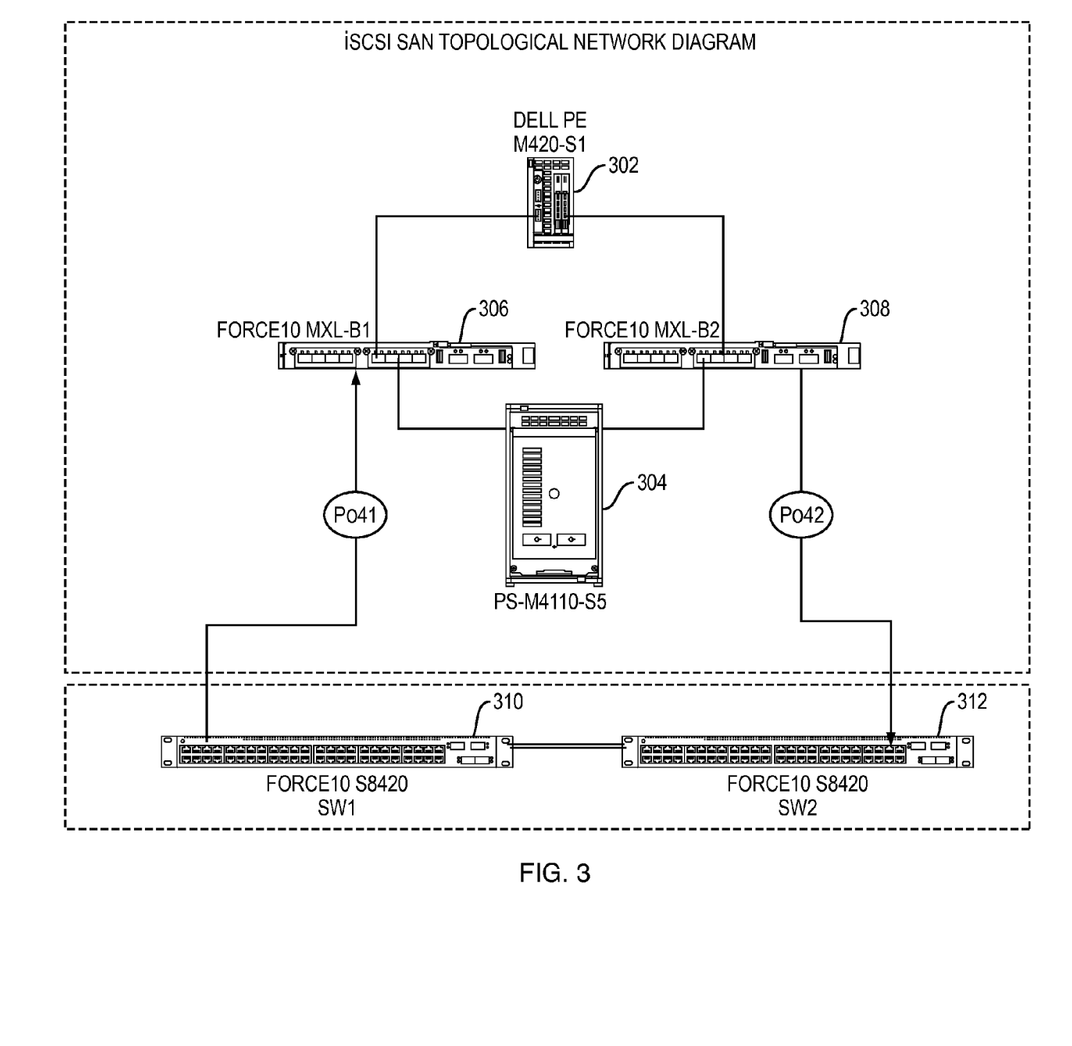
FIG. 3 shows an example of the information from the connection XML files, mapped to a graphical format according to the described embodiments.

FIG. 3 shows an example of the information from the connection XML files, set forth in the point-to-point table 200 of FIG. 2, mapped to a graphical format according to the described embodiments. FIG. 3 shows a PowerEdge M420 302, a PS-M4110 304, two Force10 MXL switches 306, 308 and two other Force10 switches 310, 312.

Figure 4:
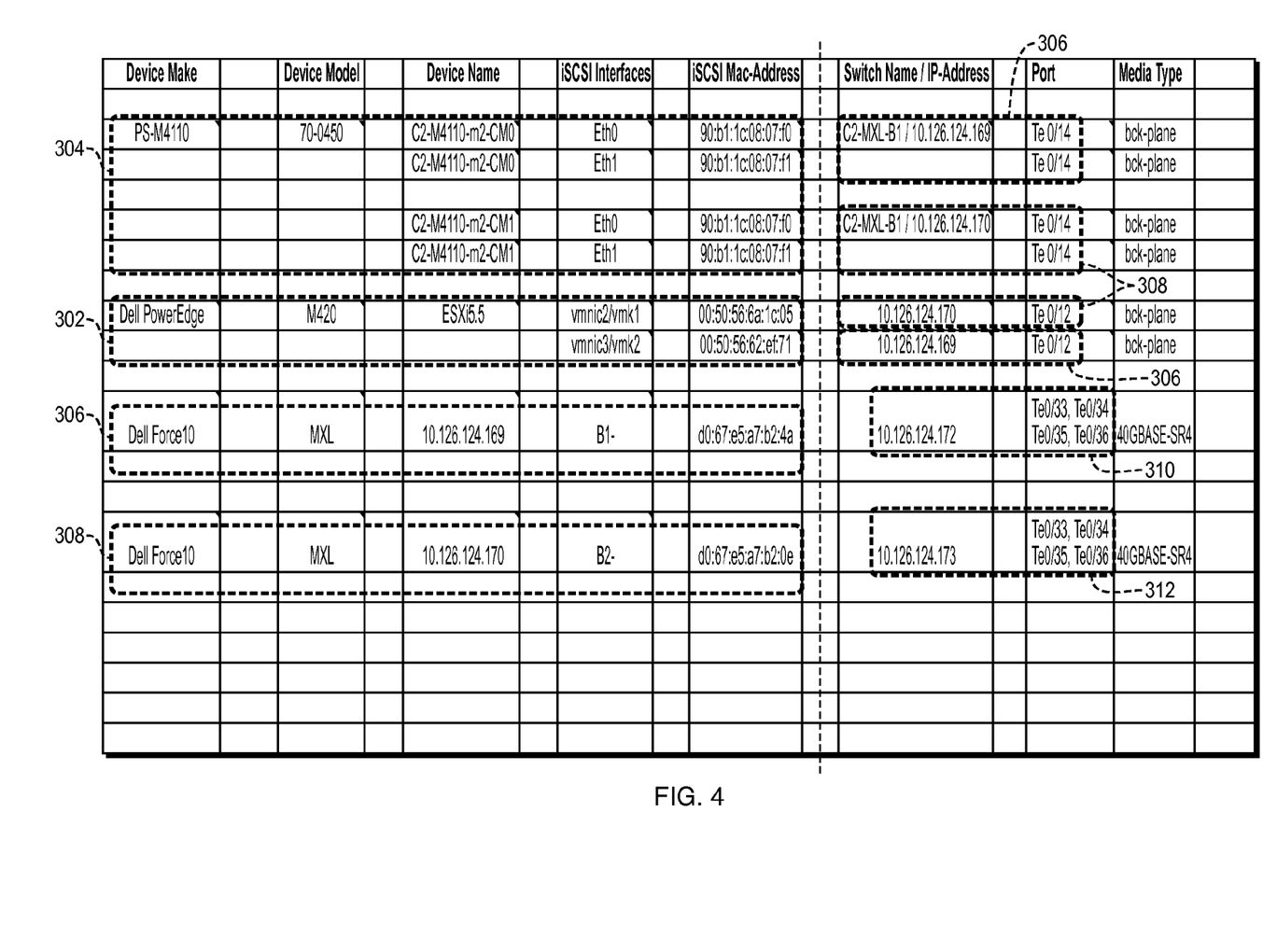
FIG. 4 illustrates the correspondence between the graphical elements of FIG. 3 with the point-to-point elements of FIG. 2.

The spreadsheet of FIG. 2 is copied in FIG. 4, and superimposed with the network element reference numbers from FIG. 3 to illustrate the correspondence between the graphical elements of FIG. 3 with the point-to-point elements of FIG. 2. The first four populated rows at the top of the spreadsheet of FIG. 4 thus describe two connections between PS-M4110 304 and a first Force10 MXL switch 306, and two connections between PS-M4110 304 and a second Force10 MXL switch 308. The 5th and 6th populated rows in the spreadsheet of FIG. 4 describe two connections between M420 302 and a first Force10 MXL switch 306. The 7th and 8th populated lines in spreadsheet of FIG. 4 describe the interconnections between first Force10 MXL switches, 306 and 308 to second Force10 switches 310 and 312 respectively as shown in FIG. 3

Figure 5:
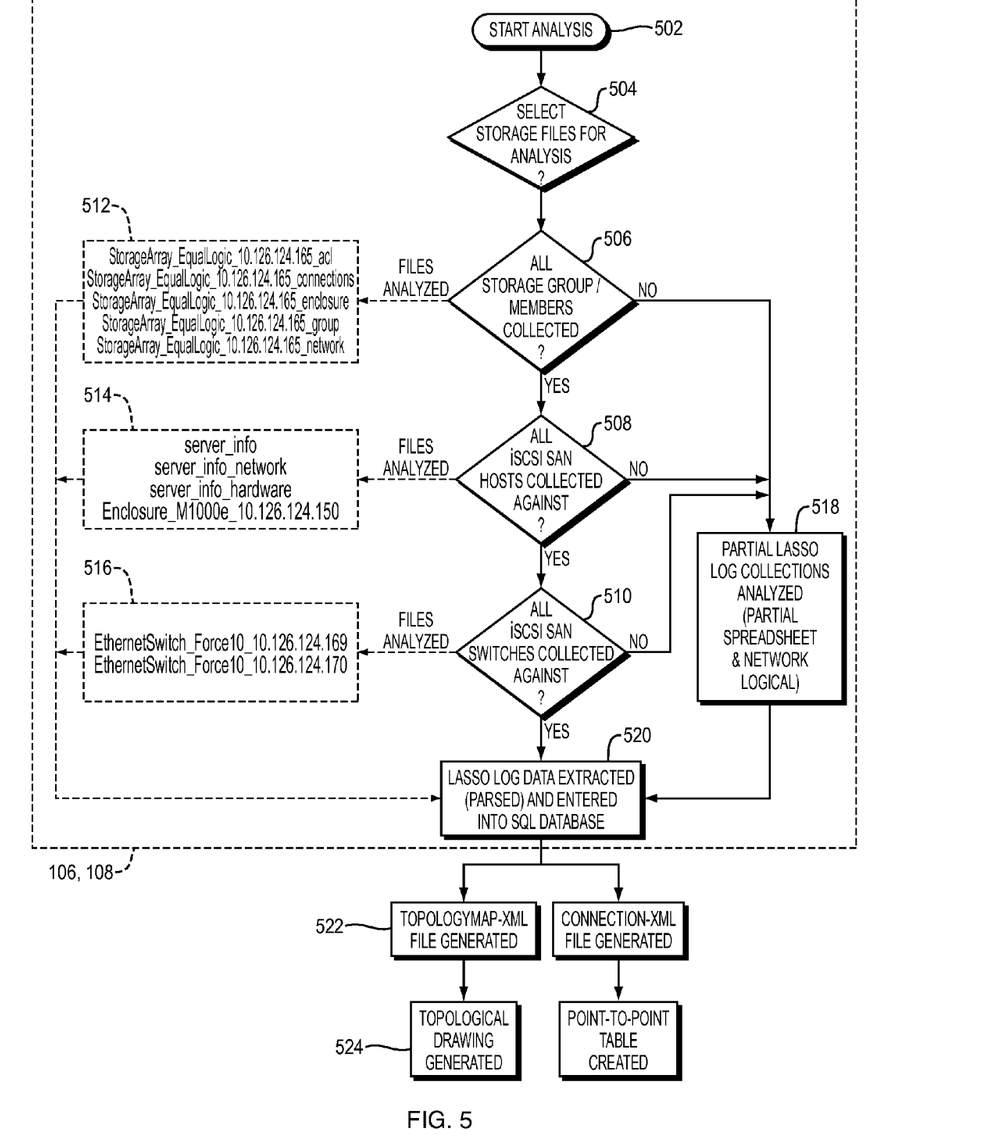
FIG. 5 illustrates an exemplary flow diagram constructed according to the described embodiments.

FIG. 5 illustrates an exemplary flow diagram constructed according to the described embodiments. This example provides a more detailed description of the processing that occurs in blocks 106 and 108 of FIG. 1. In this example, the Lasso is used to collect data against multiple network elements.

At the "Start Analysis" point 502 of the flow diagram, Lasso has already collected data against selected network elements and stored collected data in data logs, as described in blocks 102 and 104 of FIG. 1. Certain of the stored log files are selected 504 for analysis, by for example an existing configuration file or through live selection by a user (e.g., using checkboxes or other selection techniques known in the art).

The next three blocks 506, 508, 510 in the flow diagram relate to analysis of storage arrays, hosts and switches, respectively. Each of these three blocks makes a determination about whether a complete or partial collection has occurred.

Figure 6A:
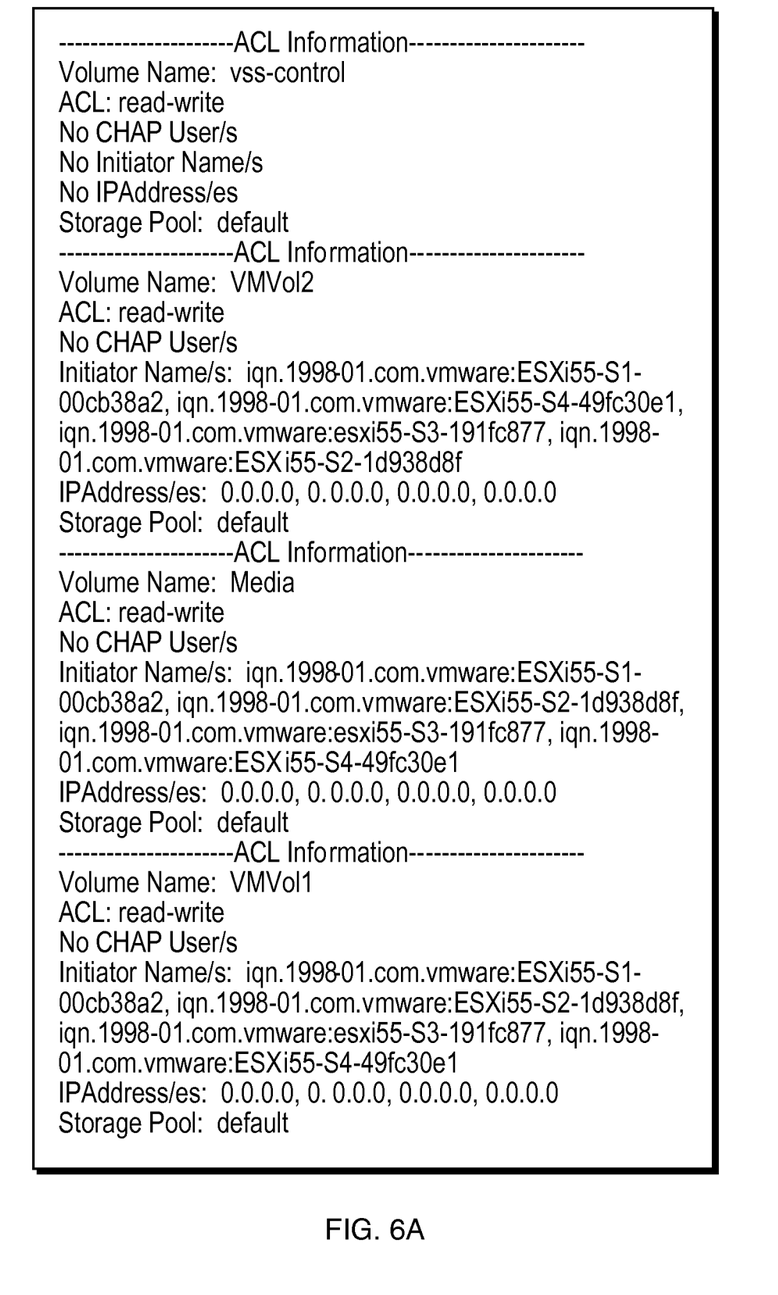
FIG. 6A illustrates an exemplary excerpt from an acl log file.

If it is determined 506 that all available storage groups and/or members have been collected against, specific storage log files 512 are analyzed. In this example, log files relating to storage access control list (acl) information, storage connection information, storage enclosure information, storage group information and storage network information are analyzed. FIG. 6A illustrates an exemplary excerpt from an acl log file and FIG. 6B illustrates an exemplary excerpt from a connection log file.

If it is determined 508 that all available host devices have been collected against, specific host log files 514 are analyzed. If it is determined 510 that all available SAN switch devices have been collected against, specific switch log files 516 are analyzed.

If any of the determinations 506, 508 or 510 indicates that some of the corresponding files have not been collected against, analysis 518 of partial log collections is performed. Following these determinations, the available log data is extracted and stored 520 in an SQL database. A partial or incomplete collection of device information and/or log files may result in an incomplete point-to-point table and topological drawing, although such a partial table or drawing may provide useful information to the user.

The data stored in the SQL database is used to generate 522 a topology XML file, from which a topological drawing is generated 524.

Figure 7:
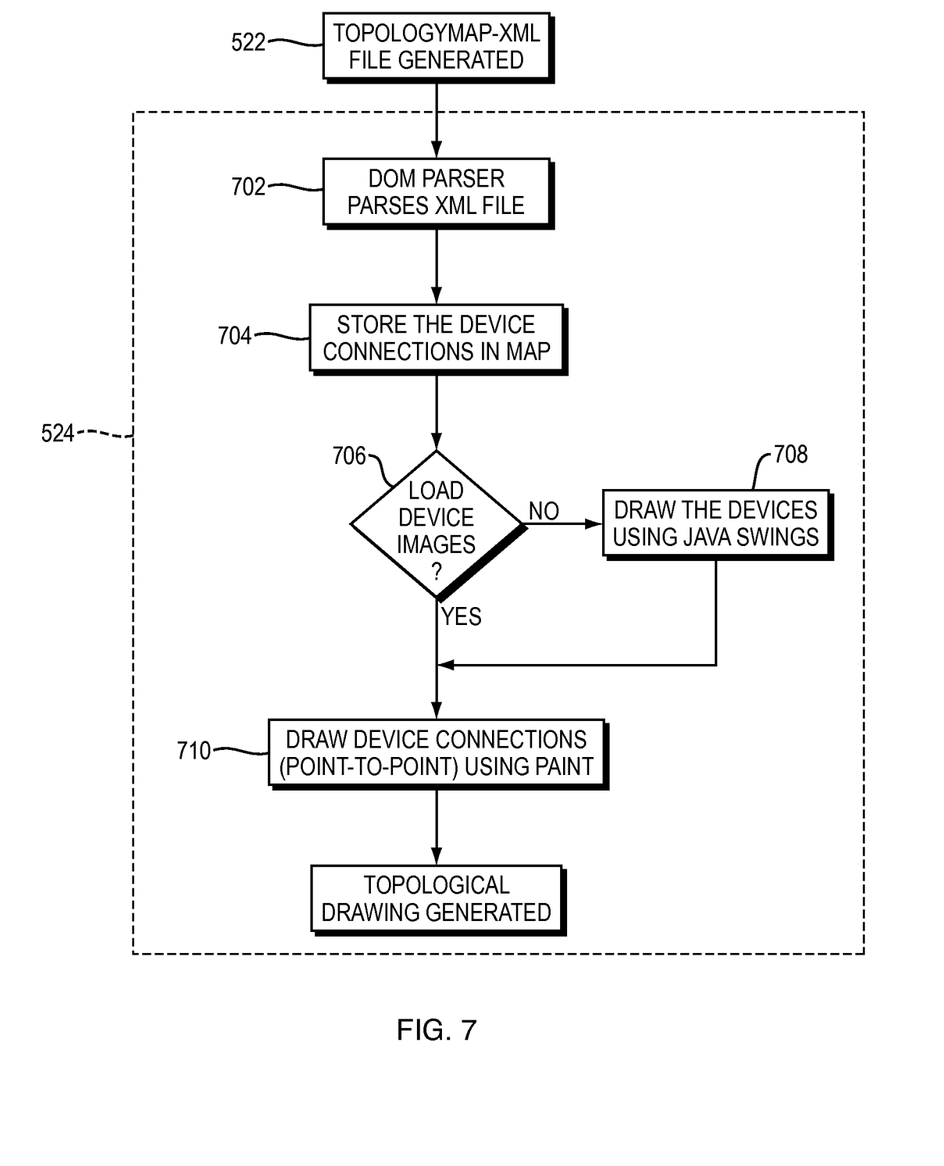
FIG. 7 illustrates an example procedure for generating 524 a topological drawing according to the described embodiments.
Figure 8A:
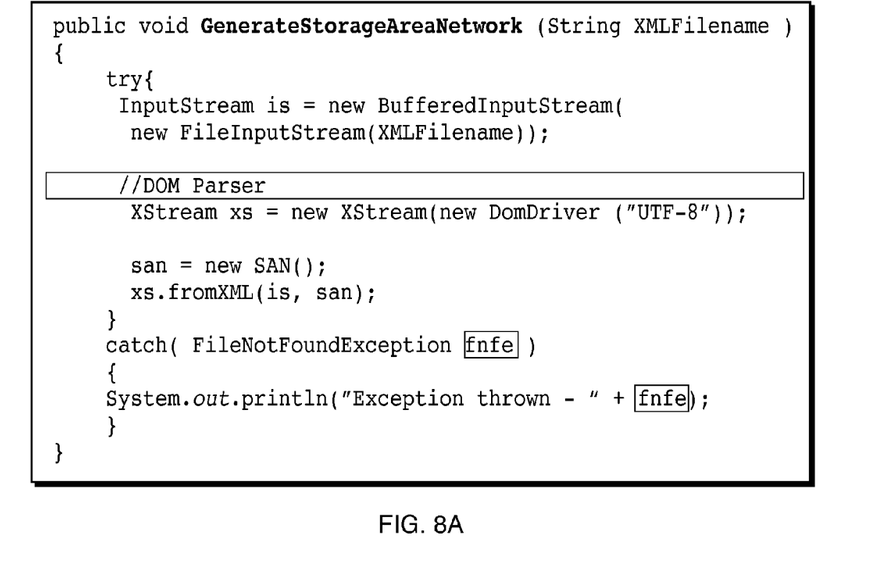
FIG. 8A shows example code associated with parsing an XML file.

FIG. 7 illustrates an example procedure for generating 524 a topological drawing according to the described embodiments. Once the topology XML file is generated, the Dom Parser parses 702 the XML file. Example code associated with parsing the XML file is shown in FIG. 8A.

Figure 8B:
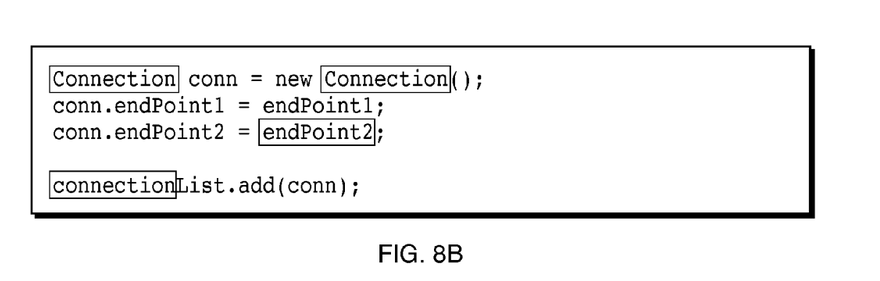
FIG. 8B shows example code associated with storing device connections.

Device connections extracted from the XML file are stored 704 in MAP. Example code associated with storing device connections is shown in FIG. 8B.

Figure 8C:
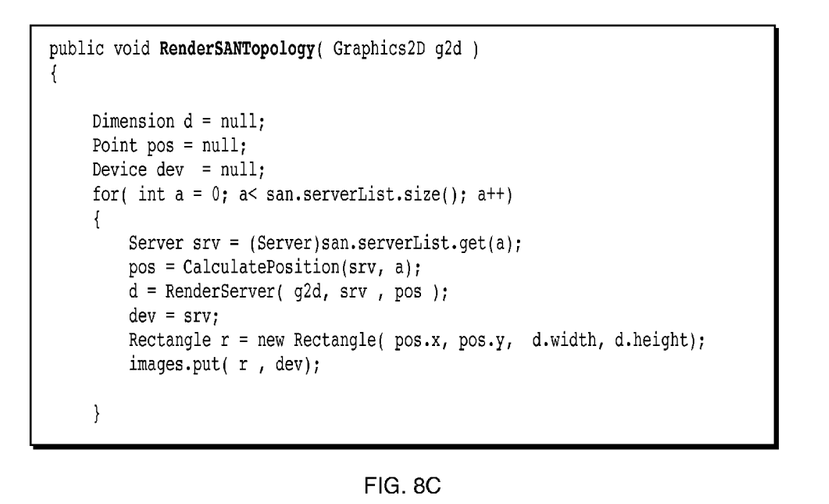
FIG. 8C shows example code associated with rendering device images.

If device images corresponding to device information from the XML files, those images are loaded 706. Otherwise the required images are created (e.g., drawn) 708 using for example a drawing utility such as Java Swings. Example code associated with rendering device images is shown in FIG. 8C.

Figure 8D:
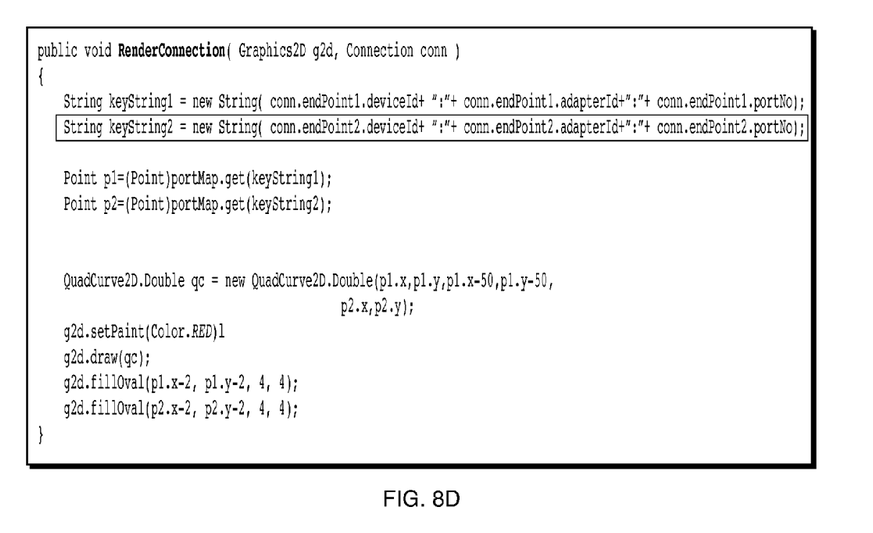
FIG. 8D example code associated with rendering connections between device images.

Once the necessary device images are either loaded or drawn, point-to-point connections between the device images are drawn 710 using interconnection information from the XML file. The connections may be drawn 710 using a drawing software application such as PAINT or other such drawing tool known in the art. Example code associated with rendering connections between device images is shown in FIG. 8D.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of presenting a network architecture, comprising:
    identifying two or more network devices for interconnection analysis;
    collecting information describing communications paths between two or more network devices;
    converting the collected information into a markup language format;
    generating, from the markup language format, a listing of the network devices and a listing of connections therebetween as a set of one or more records, each of the one or more records describing (i) a single point-to-point connection from a first network device to a second network device, (ii) a network device make and model associated with the single point-to-point connection, (iii) a network device port associated with the single point-to-point connection, (iv) a network device media type associated with the single point-to-point connection, (v) a media access control (MAC) address of the network device port associated with the single point-to-point connection;
    instantiating, based on the markup language format of the listing of the network devices, one or more images depicting each of the two or more network devices; and instantiating, based on the markup language format of the listing of connections therebetween, one or more images depicting connections between the two or more network devices.

2. The method of claim 1, further including storing the collected information in a storage medium.

3. The method of claim 2, wherein the storage medium is associated with a database.

4. The method of claim 2, wherein the collecting information generates one or more log files.

5. The method of claim 1, wherein the markup language is extensible markup language (XML).

6. The method of claim 1, further including providing a graphical user interface upon which to instantiate the images depicting each of the two or more network devices and the images depicting connections between the two or more network devices.

7. The method of claim 1, wherein identifying two or more network devices further includes identifying one or more categories of network devices.

8. The method of claim 7, wherein the one or more categories of network devices includes one or more of storage devices, host devices, switch devices and router devices.

9. The method of claim 1, wherein instantiating images depicting each of the two or more network devices further includes selecting the images from an image database.

10. The method of claim 1, wherein instantiating images depicting connections between the two or more network devices further includes rendering a trace from one of the two or more network devices to another of the two or more network devices, wherein the trace is characterized at least by a width.

11. The method of claim 1, wherein the two or more network devices include components of a storage array network.

12. A tangible, non-transitory, computer readable medium for storing computer executable instructions for presenting a network architecture, with the computer executable instructions for:
    identifying two or more network devices for interconnection analysis;
    collecting information describing communications paths between two or more network devices;
    converting the collected information into a markup language format;
    generating, from the markup language format, a listing of the network devices and a listing of connections therebetween as a set of one or more records, each of the one or more records describing (i) a single point-to-point connection from a first network device to a second network device, (ii) a network device make and model associated with the single point-to-point connection, (iii) a network device port associated with the single point-to-point connection, (iv) a network device media type associated with the single point-to-point connection, and (v) a media access control (MAC) address of the network device port associated with the single point-to-point connection;
    instantiating, based on the markup language format of the listing of the network devices, one or more images depicting each of the two or more network devices; and
    instantiating, based on the markup language format of the listing of connections therebetween, one or more images depicting connections between the two or more network devices.

13. The tangible, non-transitory, computer readable medium of claim 12, further including instructions for storing the collected information in a storage medium.

14. The tangible, non-transitory, computer readable medium of claim 12, further including instructions for storing the collected information in a database system.

15. The tangible, non-transitory, computer readable medium of claim 12, further including instructions for converting the collected information into an XML format.

16. The tangible, non-transitory, computer readable medium of claim 12, further including instructions for providing a graphical user interface upon which to instantiate the images depicting each of the two or more network devices and the images depicting connections between the two or more network devices.

17. The tangible, non-transitory, computer readable medium of claim 12, further including instructions for identifying one or more categories of network devices.

18. The tangible, non-transitory, computer readable medium of claim 12, further including instructions for selecting the images from an image database.

19. The tangible, non-transitory, computer readable medium of claim 12, further including instructions for rendering a trace from one of the two or more network devices to another of the two or more network devices, wherein the trace is characterized at least by a width.

20. The tangible, non-transitory, computer readable medium of claim 12, further including instructions for identifying two or more storage area network components.

* * * * *